US010856664B2

(12) United States Patent
Bhatia et al.

(10) Patent No.: US 10,856,664 B2
(45) Date of Patent: Dec. 8, 2020

(54) SEAT BACK AND CUSHION VENTILATION ASSEMBLY

(71) Applicants: Toyota Motor Engineering & Manufacturing North America, Inc., Plano, TX (US); Adient Engineering And IP GmbH, Burscheid (DE)

(72) Inventors: Vikas Bhatia, South Lyon, MI (US); Brandon J. Vick, Milan, MI (US); Vasile V. Jurge, Canton, MI (US)

(73) Assignees: Toyota Motor Engineering & Manufacturing North America, Inc., Plano, TX (US); Adient Engineering And IP GmbH, Burscheid (DE)

( * ) Notice: Subject to any disclaimer, the term of this patent is extended or adjusted under 35 U.S.C. 154(b) by 0 days.

(21) Appl. No.: 16/294,703

(22) Filed: Mar. 6, 2019

(65) Prior Publication Data
US 2019/0298072 A1 Oct. 3, 2019

Related U.S. Application Data

(60) Provisional application No. 62/650,833, filed on Mar. 30, 2018.

(51) Int. Cl.
*B60N 2/56* (2006.01)
*B60N 2/58* (2006.01)
*A47C 7/74* (2006.01)
*A47C 27/12* (2006.01)

(52) U.S. Cl.
CPC ............ *A47C 7/746* (2013.01); *A47C 27/125* (2013.01); *B60N 2/565* (2013.01); *B60N 2/5642* (2013.01)

(58) Field of Classification Search
CPC .............................. B60N 2/5642; B60N 2/565
USPC ............ 297/180.13, 180.14, 452.42, 452.46, 297/452.47
See application file for complete search history.

(56) References Cited

U.S. PATENT DOCUMENTS

| 6,062,641 | A | 5/2000 | Suzuki et al. | |
|---|---|---|---|---|
| 6,929,322 | B2 * | 8/2005 | Aoki | B60H 1/00285 297/180.13 |
| 7,931,330 | B2 * | 4/2011 | Itou | B60N 2/5635 297/180.14 |
| 8,191,187 | B2 * | 6/2012 | Brykalski | A47C 21/044 297/180.13 X |
| 8,585,137 | B2 | 11/2013 | Park et al. | |
| 9,456,702 | B2 | 10/2016 | Miyata et al. | |
| 9,925,899 | B2 * | 3/2018 | Mogi | B60N 2/5642 |

(Continued)

FOREIGN PATENT DOCUMENTS

WO WO 2015/045874 A1 4/2015
WO WO 2016/025776 A1 2/2016

*Primary Examiner* — Rodney B White
(74) *Attorney, Agent, or Firm* — Oblon, McClelland, Maier & Neustadt, L.L.P.

(57) ABSTRACT

The present disclosure relates to a seat ventilation system for deployment in a seat of a vehicle. Specifically, the seat ventilation system includes a three-dimensional mesh for maintenance of airflow channels and a ductless blower system to prevent system pressure loss. The air-permeable three-dimensional scaffold prevents compression and closure of pad-based airflow channels. The blower system reduces system air pressure loss by residing adjacent to the volume of interest, eliminating the need for ductwork.

16 Claims, 10 Drawing Sheets

(56) References Cited

U.S. PATENT DOCUMENTS

| | | | | |
|---|---|---|---|---|
| 2003/0102699 A1* | 6/2003 | Aoki | ............... | B60H 1/00285 |
| | | | | 297/180.14 |
| 2006/0175877 A1* | 8/2006 | Alionte | ............... | A47C 7/74 |
| | | | | 297/180.14 |
| 2013/0097777 A1* | 4/2013 | Marquette | ............... | A47C 7/74 |
| | | | | 297/180.13 X |
| 2015/0274049 A1* | 10/2015 | Langensiepen | ...... | B60N 2/5628 |
| | | | | 297/180.12 |
| 2016/0096460 A1* | 4/2016 | Storgato | ............... | B60N 2/5657 |
| | | | | 297/180.13 |
| 2017/0248146 A1* | 8/2017 | Wheeler | ............... | H02K 9/16 |
| 2017/0361742 A1* | 12/2017 | Craig | ............... | B60N 2/5657 |
| 2018/0147962 A1* | 5/2018 | Longatte | ............... | B60N 2/7017 |
| 2018/0272836 A1* | 9/2018 | Humer | ............... | B60H 1/00285 |
| 2018/0354395 A1* | 12/2018 | Arata | ............... | A47C 7/74 |
| 2019/0038229 A1* | 2/2019 | Perraut | ............... | A61F 7/007 |

\* cited by examiner

SEAT BACK AND CUSHION VENTILATION ASSEMBLY

CROSS-REFERENCE TO RELATED APPLICATIONS

The present application claims priority to U.S. Provisional Application No. 62/650,833, filed Mar. 30, 2018, the teaching of which is hereby incorporated by reference in its entirety for all purposes.

BACKGROUND

While heating elements have been available in vehicle seats for a number of years, seat ventilation systems are a recent addition. Early versions of these seat ventilation systems require airflow channels within the seat cushion to serve as a conduit for airflow, and thus, heat transfer. This approach often results in passenger discomfort or the collapse of airflow channels and the loss of ventilation under normal user loads. U.S. Pat. No. 9,456,702 B2, entitled "Seat with ventilative property" by Miyata, et al. is directed to a three-dimensional network cushion element that extends the full thickness of the cushion from the seat frame to the seat pad.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a seat ventilation system for deployment in a seat of a vehicle. Specifically, the seat ventilation system includes a three-dimensional mesh for maintenance of airflow channels and a ductless blower system to prevent system pressure loss. In a seat cushion, the three-dimensional mesh is a component of a pad assembly that includes a pad, a pre-formed backing cloth, the three-dimensional mesh, a dual-layer pressed felt, and a foam seal. In a seat back, the three-dimensional mesh is a component of a pad assembly that includes a pad, a backing cloth, the three-dimensional mesh, a dual-layer pressed felt, and a pressed felt adapter.

The air-permeable three-dimensional scaffold prevents compression and closure of pad-based airflow channels. The blower system reduces system air pressure loss by residing adjacent to the volume of interest, eliminating the need for ductwork. In the seat cushion, the blower connects to the pad assembly via blower adapter, foam seal, and a cushion pan. In the seat back, the blower connects to the pad assembly via a blower adapter mounted on lumbar.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9A is a component of a dual-layer pressed felt of the seat back of the seat of a vehicle, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Current seat ventilation systems require airflow channels either constructed of a seat pad or integrated into a plus pad on top of the seat pad. These approaches may result in inefficient cooling or passenger discomfort, respectively, as the load of a user collapses air channels. The present disclosure describes a seat design that eliminates the performance concerns associated with pad channel collapse and air pressure loss in ductwork while maintaining or improving comfort levels of seat pads without such systems.

Figure 1:
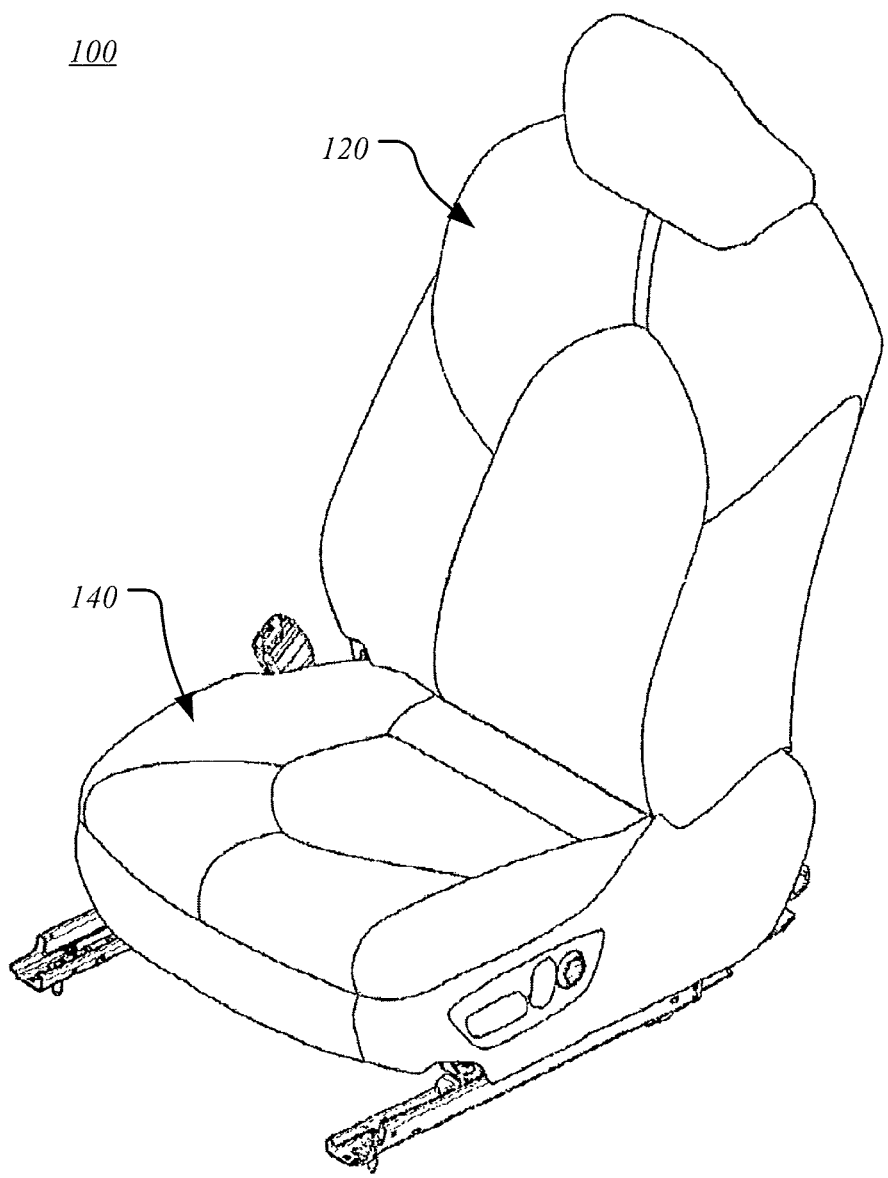
FIG. 1 is a perspective view of a seat of a vehicle.

FIG. 1 is a perspective view of a seat 100 of a vehicle. The seat 100 of the vehicle includes a seat cushion 140 and a seat back 120. In an embodiment of the present disclosure, the seat 100 is the seat of a driver of a motor vehicle. In another embodiment, and in a non-limiting manner, the seat 100 is a passenger seat of a motor vehicle. In a further embodiment, and in a non-limiting manner, the seat is of a motor- or non-motor vehicle, including scooters, motorcycles, and bicycles. A seat ventilation system is contained within the seat 100. A heating element may be present at an apical surface of the seat cushion and seat back without interfering with the ventilation architecture of the seat. Discussed herein as a single unit, the seat cushion 140 and seat back 120 may exists independently or in combination with other systems as the functionality of the seat ventilation system is independent in each case. Further, unless otherwise specified, materials and manufacturing processes are non-limiting and include those available to one of ordinary skill in the art.

Figure 2A:
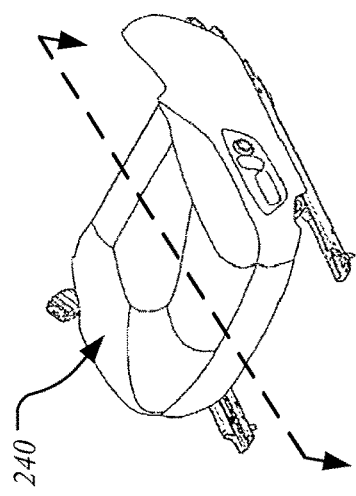
FIG. 2A is a perspective view of a seat cushion of the seat of a vehicle.
Figure 2B:
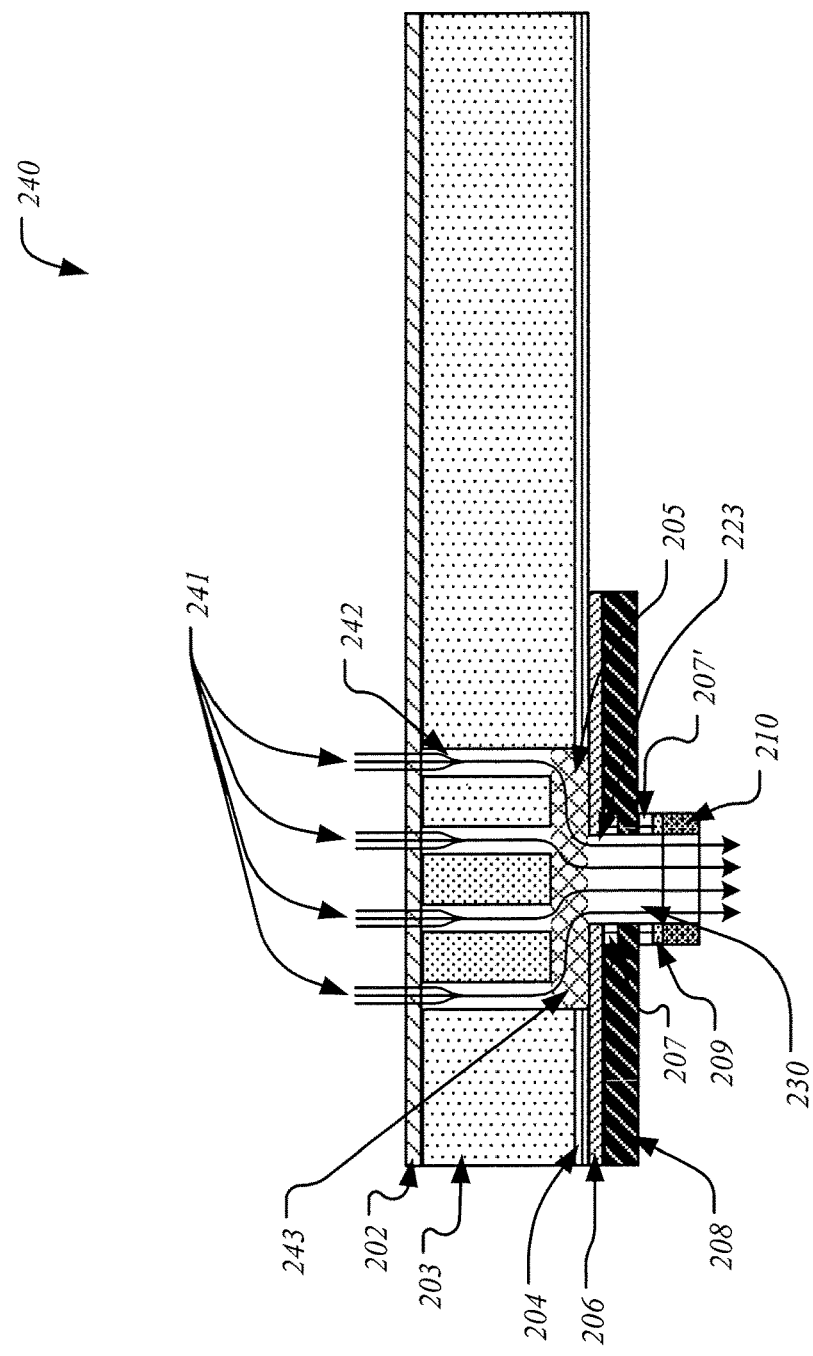
FIG. 2B is a cross-sectional view of the seat cushion of the seat of a vehicle, according to an exemplary embodiment of the present disclosure.

FIG. 2A is a perspective view of the seat cushion 240 of the seat of a vehicle. The dashed line indicates a cross-sectional slice of the seat cushion 240 along an axis of the seat. Therefore, FIG. 2B is a cross-sectional view of the seat cushion 240 of the seat of a vehicle, according to an exemplary embodiment of the present disclosure, along the dashed line of FIG. 2A. As it is relevant to the below description of the seat cushion, assembly of the seat cushion is completed with techniques known to one of ordinary skill in the art (e.g. fasteners, adhesives, etc.).

In FIG. 2B, a trim cover 202 of the seat cushion 240 is at an apical surface of the seat cushion 240 and is in a position to directly contact a user. In an embodiment, the trim cover 202 is comprised of a substantially air permeable textile. The substantially air permeable textile can include perforations for the transport of air. In another embodiment, the trim cover 202 is designed to incorporate trim cover air passages (or holes) in specific locations according to the position and pressure distribution of the user on the seat cushion 240. The diameter, number, and density of air passages may vary according to the desired air flow characteristics (e.g., air flow speed, air flow volume, air flow noise), but is generally considered to be of a cross sectional area sufficient to produce an air flow pressure lower than the air flow pressure of the adjacent segments of the seat cushion 240. In an exemplary embodiment, a heating element is incorporated adjacent to the trim cover and is designed in context of the air permeable textile or trim cover air passages, if present. Adjacent and deep to the trim cover 202, a seat pad 203 of a predetermined thickness is disposed. The predetermined thickness of the seat pad 203 is sufficient to provide cushioning and comfort to the user during vehicle operation. Incorporated within the seat pad 203 are seat pad air channels 242. The seat pad air channels 242 extend through the predetermined thickness of the seat pad 203 and provide a connection between the apical surface of the seat cushion and the seat pad air reservoir 243 (discussed below). In an embodiment, the seat pad air channels 242 are arranged in context of the position and pressure distribution of the user, allowing maximal heat transfer from the user to the air stream. In another embodiment, the seat pad air channels 242 are further positioned in context of trim cover air passages for efficient air flow under user loads. The diameter, number, and density of the seat pad air channels 242 varies according to the desired air flow characteristics (e.g. air flow speed, air flow volume, air flow noise), but is generally considered to be of a cross-sectional area sufficient to produce an air flow pressure lower than the air flow pressure of seat cushion segments nearer the blower 210.

In an exemplary embodiment, four seat pad air channels 242 are disposed toward an end of the seat cushion 240 to provide directed air flow 241 from under the thighs of a user. While the seat pad air channels 242 of the seat are specifically arranged in the exemplary seat cushion 240 in FIG. 2B, the arrangement of these conduits is non-limiting and is based upon a determination of the preferred airflow characteristics in context of the user.

The seat pad air reservoir 243 connects the seat pad air channels 242 to a main air conduit 230 in connection with the blower 210. The seat pad air reservoir 243 is shaped according to the dimensions of a three-dimensional mesh 205 seated within. The three-dimensional mesh 205 may take a variety of predetermined shapes and sizes according to the requirements of the user and the dimensions of the seat pad 203, but can generally be described as an air-permeable lattice structure, comprised of a flexible yet not substantially compressible material, configured to maintain patency of the seat pad air reservoir 243 under loading by the user during normal operation. Preserving the seat pad air reservoir 243 in an open position ensures continuous airflow axially through the seat cushion 240 and, thus, seat ventilation. Moreover, the seat pad air reservoir 243 and three-dimensional mesh 205 are disposed towards a basal surface of the seat pad 203 but within a broad geometric boundary of the seat pad 203. Disposing the three-dimensional mesh 205 towards the basal surface of the seat pad 203 positions the support structure sufficiently deep in the seat pad 203 so as not to impact user comfort. Further, this allows a basal surface of the three-dimensional mesh 205 to rest immediately adjacent to the basal surface of the seat pad 203. This relationship will be discussed below, while the three-dimensional mesh 205 is discussed in greater detail in FIG. 4 and FIG. 7.

Because the three-dimensional mesh 205 is positioned where the basal surface of the three-dimensional mesh 205 and the basal surface of the seat pad 203 are flush, the shape of the three-dimensional mesh 205 does not impact seat construction and, therefore, user comfort.

In an exemplary embodiment, a pre-formed backing cloth 204, comprised of materials including, but not limited to, textiles and polymers, is disposed on the basal surface of the seat pad 203. The pre-formed backing cloth 204, unlike traditional approaches, is shaped prior to installation in the seat cushion 240. Further, the pre-formed backing cloth 204 is of dimensions to cover the full B-surface of the seat pad 203. As a result, the pre-formed backing cloth 204 seals the seat pad and prevents the escape of air flow from unintended regions of the seat pad 203. In another embodiment, the backing cloth is not shaped prior to installation. As the pre-formed backing cloth 204 of the present embodiment is shaped prior to installation to match the basal surface of the seat pad 202, resulting in a consistently uniform surface, subsequent installation of a dual-layer pressed felt 206 can be similarly completed. The dual-layer pressed felt 206 is comprised of a plastic A-surface, a durable textile B-surface, and an air flow passage 223. The A-surface is shaped to match the contour of the pre-formed backing cloth 204 while the B-surface is shaped to the apical contours of a cushion pan 208. In an exemplary embodiment, the A-side of the dual-layer pressed felt 206 can be comprised of a variety of materials including, but not limited to, metals, textiles, and polymers, including cross-linked polypropylene, high density polyethylene, ultra-high molecular weight polyethylene, and polyethylene terephthalate. The B-side of the dual-layer pressed felt 206 can be comprised of a variety of materials including, but not limited to, metals, polymers, and textiles, including wool, acrylic, silk, and felt. A gasket 207 connects the dual-layer pressed felt 206 to the cushion pan 208. In an exemplary embodiment, the gasket 207 is comprised of closed-cell foam, but it is implied the gasket 207 can be comprised of any air-impermeable material configured to support the load of a user and seal a segment of the main air conduit 230. The cushion pan 208 is disposed between the gasket 207 in connection with the dual-layer pressed felt 206 and an additional gasket 207' connected to a blower adapter 209. The blower adapter 209 allows the blower 210 to be mounted directly to the cushion pan 208. In this way, the main air conduit 30 is formed without ductwork typical of seat ventilation systems. Moreover, the position of the blower 210 with respect to the apical surface of the seat cushion 240, and the sealed construction of the system, reduces noise pollution in the vehicle. The blower 210 can be configured to push air or pull air in accordance with the desired air flow characteristics (characteristics (e.g. air flow speed, air flow volume, air flow noise). In another embodiment, the blower can be further configured, in combination with a compressor, to provide temperature controlled air to the user.

In an exemplary embodiment of the seat ventilation system in a seat cushion 240, a user is seated in contact with the trim cover 202. The trim cover 202 is a substantially air permeable material. The trim cover is adjacent to seat pad air channels 242, arranged according to the position and pressure distribution of the user, providing a fluid connection to the seat pad air reservoir 243. Due to the congruency of seat construction, the seat pad air reservoir 243 is seamlessly connected to the main air conduit 230 that delivers air flow to the blower 210. In this embodiment, the blower 210 is configured to pull air 241 through the substantially air permeable trim cover 202 followed by the seat pad air channels 242, the three-dimensional mesh 205 and seat pad air reservoir 243, and the main air conduit 230, ultimately exhausting from the blower 210 under the seat cushion.

Figures 3A, 3B:
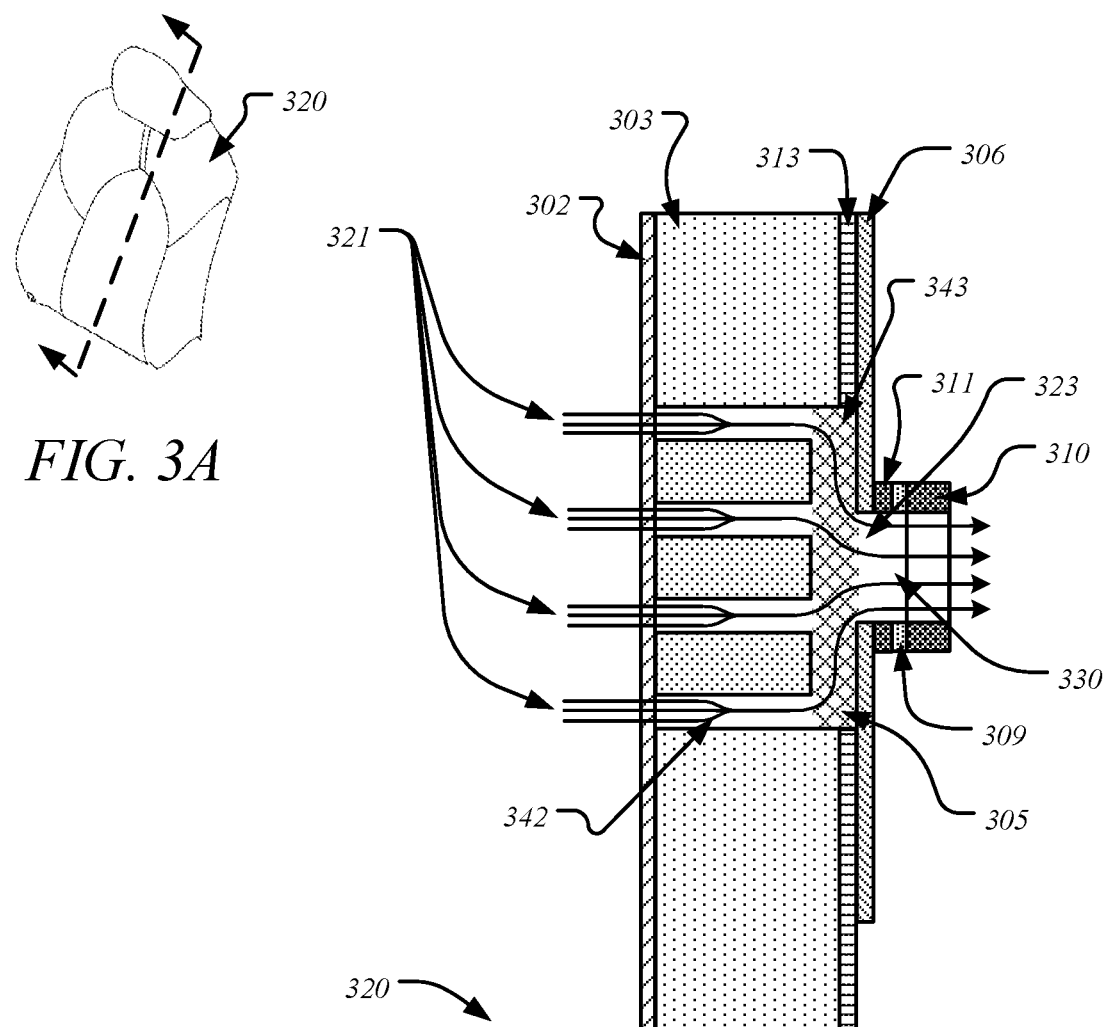
FIG. 3A is a perspective view of a seat back of the seat of a vehicle.
FIG. 3B is a cross-sectional view of the seat back of the seat of a vehicle, according to an exemplary embodiment of the present disclosure.

Similarly, the seat ventilation system of the seat back is described in FIG. 3. FIG. 3A is a perspective view of the seat back 320 of the seat of a vehicle. The dashed line indicates a cross-sectional slice of the seat back 320 along an axis of the seat. Therefore, FIG. 3B is a cross-sectional view of the seat back 320 of the seat of a vehicle, according to an exemplary embodiment of the present disclosure, along the dashed line of FIG. 3A. As it is relevant to the below description of the seat cushion, assembly of the seat cushion is completed with techniques known to one of ordinary skill in the art (e.g. fasteners, adhesives, etc.).

In FIG. 3B, a trim cover 302 of the seat back 320 is at an apical surface of the seat back 320 and is in a position to directly contact a user. In an embodiment, and similar to the seat cushion in FIG. 2B, the trim cover 302 is comprised of a substantially air permeable textile. The substantially air permeable textile can include perforations for the transport of air. In another embodiment, the trim cover incorporates trim cover air passages (or holes) in specific locations according to the position and pressure distribution of the user on the seat back 320. The diameter, number, and density of air passages varies according to the desired air flow characteristics (e.g., air flow speed, air flow volume, air flow noise), but is generally considered to be of a cross sectional area sufficient to produce an air flow pressure lower than the air flow pressure of the adjacent segments of the seat cushion. In an exemplary embodiment, a heating element is incorporated adjacent to the trim cover and is designed in context of the air permeable textile or trim cover air passages, if present. Adjacent and deep to the trim cover 302, a seat pad 303 of a predetermined thickness is disposed. The predetermined thickness of the seat pad 303 is sufficient to provide cushioning and comfort to the user during vehicle operation. Incorporated within the seat pad 303 are seat pad air channels 342. The seat pad air channels 342 extend through the predetermined thickness of the seat pad 303 and provide a connection between the apical surface of the seat cushion and the seat pad air reservoir 343 (discussed below). In an embodiment, the seat pad air channels 342 are arranged in context of the position and pressure distribution of the user, allowing maximal heat transfer from the user to the air stream. In another embodiment, the seat pad air channels 342 are further positioned in context of trim cover air passages for efficient air flow under user loads. The diameter, number, and density of the seat pad air channels 342 varies according to the desired air flow characteristics (e.g. air flow speed, air flow volume, air flow noise), but is generally considered to be of a cross-sectional area sufficient to produce an air flow pressure lower than the air flow pressure of seat back segments nearer the blower 310.

In an exemplary embodiment, four seat pad air channels 342 are disposed toward an end of the seat back 320 to provide directed air flow 321 from behind the shoulder blades of a user. While the seat pad air channels 342 of the seat are specifically arranged in the exemplary seat back 320 in FIG. 3B, the arrangement of these conduits is non-limiting and is based upon a determination of the preferred airflow characteristics in context of the user.

The seat pad air reservoir 343 connects the seat pad air channels 342 to a main air conduit 330 in connection with the blower 310. The seat pad air reservoir 343 is shaped according to the dimensions of a three-dimensional mesh 305 seated within. The three-dimensional mesh 305 may take a variety of predetermined shapes and sizes according to the requirements of the user and the dimensions of the seat pad 303, but can generally be described as an air-permeable lattice structure, comprised of a flexible yet not substantially compressible material, configured to maintain patency of the seat pad air reservoir 343 under loading by the user during normal operation. Preserving the seat pad air reservoir 343 in an open position ensures continuous airflow through the seat back 320 and, thus, ventilation. Moreover, the seat pad air reservoir 343 and three-dimensional mesh 305 are disposed towards a basal surface of the seat pad 303 but within a broad geometric boundary of the seat pad 303. Disposing the three-dimensional mesh 305 towards the basal surface of the seat pad 303 positions the support structure sufficiently deep in the seat pad 303 so as not to impact user comfort. Further, this allows a basal surface of the three-dimensional mesh 305 to rest immediately adjacent to the basal surface of the seat pad 303. This relationship will be discussed below, while the three-dimensional mesh 305 is discussed in greater detail in FIG. 4 and FIG. 7.

Because the three-dimensional mesh 305 is positioned where the basal surface of the three-dimensional mesh 305 and the basal surface of the seat pad 303 are flush, the shape of the three-dimensional mesh 305 does not impact seat construction and, therefore, user comfort.

In an exemplary embodiment, a backing cloth 313, comprised of materials including, but not limited to, textiles and polymers, is disposed on the basal surface of the seat pad 303. Due to the relatively mild contouring of the seat back 320, the backing cloth 313 can be manually pressed to install. Similar to the pre-formed backing cloth of the seat cushion, the backing cloth 313 is installed to cover the full B-surface of the seat pad, thus preventing air from escaping at unintended locations. In another embodiment, the backing cloth 313 is pre-formed. Following installation of the backing cloth 313, a dual-layer pressed felt 306 can be installed uniformly. The dual-layer pressed felt 306 is comprised of a plastic A-surface, a durable textile B-surface, and an air flow passage 323. The A-surface is shaped to match the surface of the backing cloth 313. In an exemplary embodiment, the A-side of the dual-layer pressed felt 206 can be comprised of a variety of materials including, but not limited to, metals, textiles, and polymers, including cross-linked polypropylene, high density polyethylene, ultra-high molecular weight polyethylene, and polyethylene terephthalate. The B-surface is shaped in a form for connection to a pressed felt adapter 311. Unlike the seat cushion, the seat back 320 does not implement a seat cushion pan, and is therefore in direct connection with the blower 310. The B-side of the dual-layer pressed felt 306 can be comprised of a variety of materials including, but not limited to, metals, polymers, and textiles, including wool, acrylic, silk, and felt. A blower adapter 309 connects the pressed felt adapter 311 to the blower 310, forming a main air conduit 330 that connects the seat pad air reservoir 342 with the exhaust of the blower 310. In construction of the seat back 320, the blower adapter 309 is attached to an extension of a lumbar system (not shown) and allows the blower 310 to be mounted adjacent to the dual-layer pressed felt 311. This construction, utilizing the lumbar system, minimizes the form factor of the seat back 320, ensuring comfort for the user of the seat and passengers in the rear of the vehicle, and improves efficiency of the ventilation system by eliminating ductwork. The position of the blower 310 with respect to the apical surface of the seat back 320, and the sealed construction of the system, further reduces noise pollution in the vehicle. The blower 310 can be configured to push air or pull air in accordance with the desired air flow characteristics (e.g. air flow speed, air flow volume, air flow noise). In another embodiment, the blower can be further configured, in combination with a compressor, to provide temperature controlled air to the user.

In an exemplary embodiment of the seat ventilation system in a seat back 320, a user is seated with back in contact with the trim cover 302. The trim cover 302 is a substantially air permeable material. The trim cover is adjacent to seat pad air channels 342, arranged according to the position and pressure distribution of the user, providing a fluid connection to the seat pad air reservoir 343. Due to the congruency of seat construction, the seat pad air reservoir 343 is directly connected to the main air conduit 330 that delivers air flow to the blower 310. In this embodiment, the blower 310 is configured to pull air 321 through the trim cover 302 followed by the seat pad air channels 342, the three-dimensional mesh 305 and seat pad air reservoir 343, and the main air conduit 330, ultimately exhausting from the blower 310 behind the seat back 320.

Figure 4A:
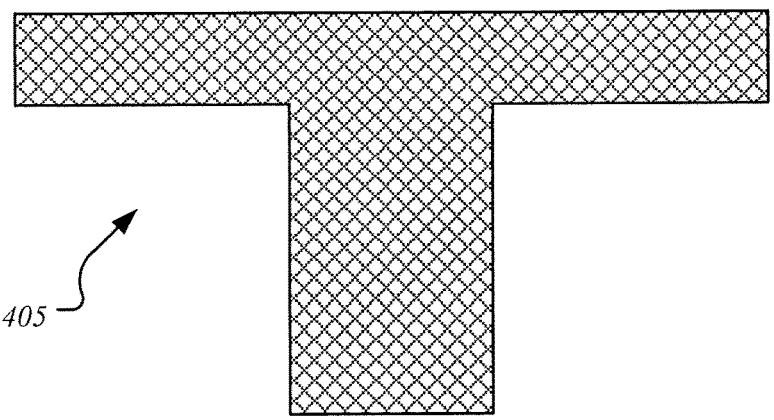
FIG. 4A is an illustration of a shape of the three-dimensional mesh utilized in the seat cushion and the seat back of the seat of a vehicle, according to an exemplary embodiment of the present disclosure.
Figure 4B:
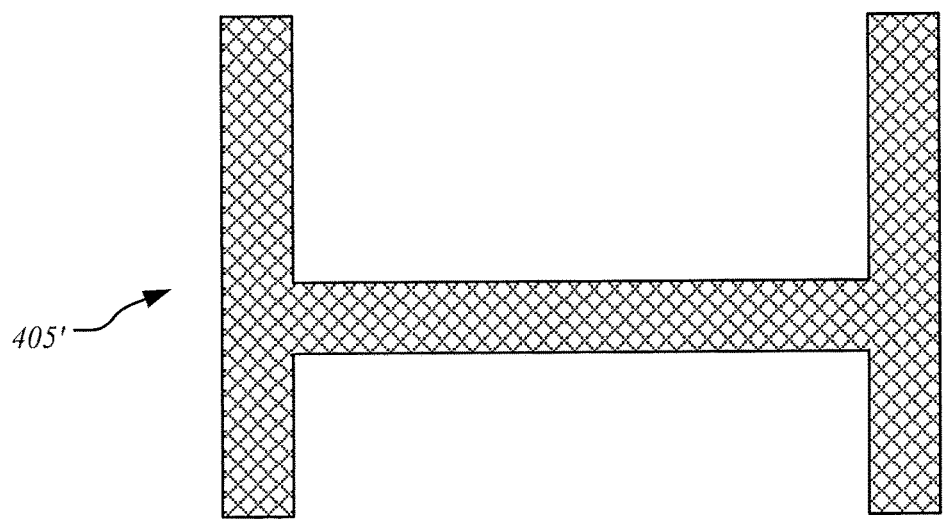
FIG. 4B is an illustration of a shape of the three-dimensional mesh utilized in the seat cushion and the seat back of the seat of a vehicle, according to an exemplary embodiment of the present disclosure.
Figure 4C:
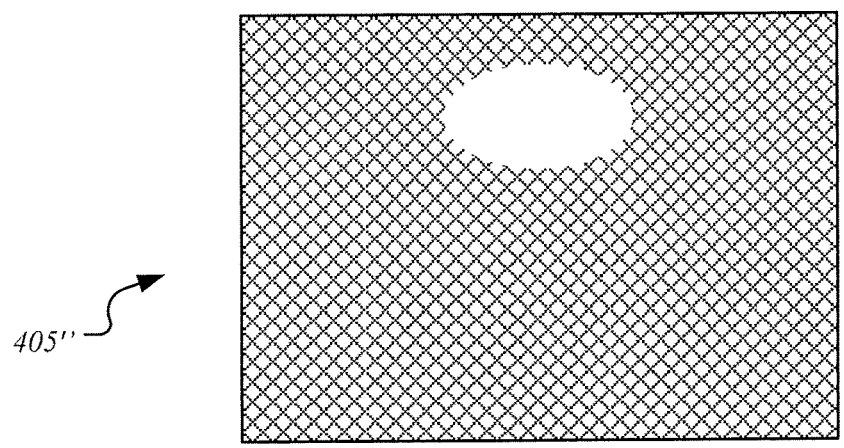
FIG. 4C is an illustration of a shape of the three-dimensional mesh utilized in the seat cushion and the seat back of the seat of a vehicle, according to an exemplary embodiment of the present disclosure.

FIG. 4A, FIG. 4B, and FIG. 4C are illustrations of a variety of shapes of the three-dimensional mesh utilized in the seat cushion and the seat back of the seat of a vehicle, according to exemplary embodiments. As the three-dimensional mesh is air-permeable and resists substantial deformation under load from a user, each design is pre-determined for a specific pattern of seat pad air channels and trim cover air passages, if present, with the understanding that air will permeate the entire volume of the three-dimensional mesh. The T-shape of FIG. 4A is an exemplary embodiment of the three-dimensional mesh 405 in a seat cushion, where the wider portion of the T-shape is positioned under the buttocks of the user and the narrow extension of the T-shape is positioned toward the legs of the user. The H-shape of FIG. 4B is an exemplary embodiment of a three-dimensional mesh 405' in a seat cushion, where the vertical portions of the three-dimensional mesh 405' align with the legs of the user and the horizontal portion of the three-dimensional mesh 405' aligns with the pelvis of the user. The rectangular shape of FIG. 4C is an exemplary embodiment of a three-dimensional mesh 405" for a seat back, where an ellipsoidal section of the three-dimensional mesh is absent. The discontinuity in the three-dimensional mesh 405" directs air flow to the intended seat pad air channels that either remove from or deliver air flow to the substantially air permeable trim cover of the seat back. In each embodiment, air flow may be introduced at any position on the three-dimensional mesh, understanding that the air flow will be dispersed evenly amongst the lattice structure of the three-dimensional mesh following its introduction.

In an embodiment, and further to two-dimensional modifications of the shape of the three-dimensional mesh 405, the thickness of the three-dimensional mesh 405 may be modified. For example, the thickness of the three-dimensional mesh 405 may be linearly related to the thickness of the seat pad at a given location of the seat cushion or seat back to prevent user discomfort, and therefore, will have different thicknesses in different locations as the thickness of the seat pad changes. In another embodiment, the lattice structure of the three-dimensional mesh 405 is modified to direct air flow in specific directions. This allows construction of the seat and the seat pad air reservoir to remain constant while providing user customization of air flow through modification to the lattice structure of the three-dimensional mesh 405. In instances where additional constraints are placed on location of the dual-layer pressed felt air passage, the ability to direct air flow inside the mesh reduces the risk of turbulence and improves ventilation efficiency. To facilitate these modifications, the three-dimensional mesh 405, may be fabricated via subtractive manufacturing or additive manufacturing, including 3D printing, in addition to standard techniques. During manufacturing, the three-dimensional mesh may be fabricated of a variety of materials suitable to maintain patency of the seat pad air reservoir including, but not limited to, polymers, textiles, and metals.

Figure 5:
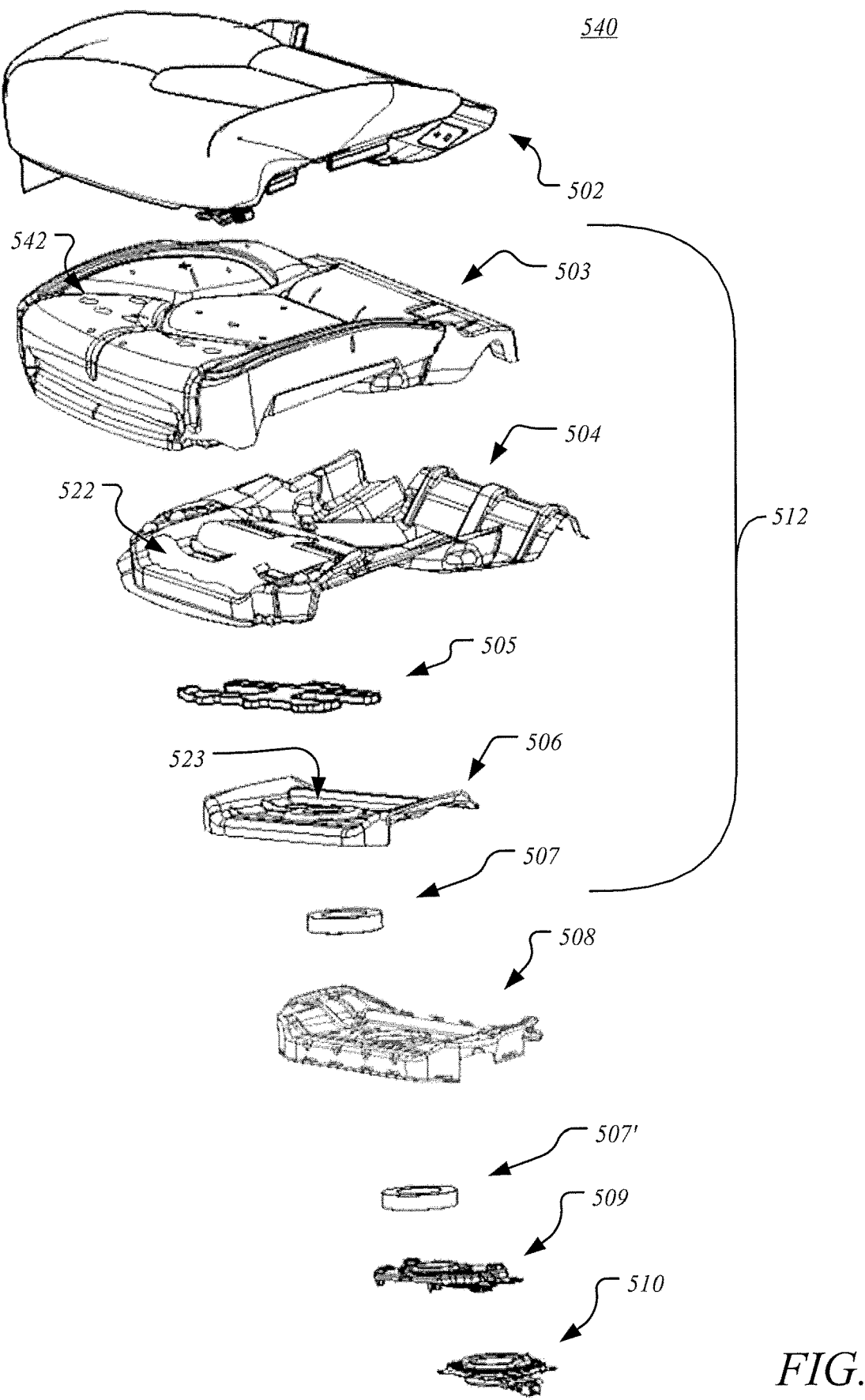
FIG. 5 is an exploded view of the seat cushion of the seat of a vehicle, according to an exemplary embodiment of the present disclosure.

FIG. 5 is an exploded view of a seat cushion of the seat of a vehicle, according to an exemplary embodiment of the present disclosure. In the exemplary embodiment, a seat trim cover 502 wraps around a seat pad 503 of the seat cushion 540. The seat pad 503 includes a series of seat pad air channels 542 disposed towards the front end of the seat pad 503 that extend the thickness of the seat pad 503, from an A-surface to a seat pad air reservoir (not visible). A pre-formed backing cloth 504, formed to a desired contour, is adhered to a full B-surface of the seat pad 503. The pre-formed shape of the backing cloth 504 provides a sealed seat pad 503 and a closed system between the main air conduit 523 and the B-surface of the seat pad 503, thus minimizing air loss. The pre-formed backing cloth 504 includes a three-dimensional mesh cutout 522 in a shape corresponding to the shape of a three-dimensional mesh 505. The three-dimensional mesh 505 is inserted within the seat pad air reservoir (not visible) of the seat pad 503 and provides support to the system of air flow conduits. The three-dimensional mesh 505 may be fabricated in a variety of shapes pursuant to the demands of the seat in the context of the user. A dual-layer pressed felt 506 is sealed to the pre-formed backing cloth 504. An A-side of the dual-layer pressed felt 506 is comprised of cross-linked polypropylene for contact with the three-dimensional mesh 505 and a B-side of the dual-layer pressed felt 506 is comprised of felt. An air flow passage 523 allows air flow to pass between the seat pad air reservoir (not visible) and the main air conduit. The dual-layer pressed felt 506 may be fabricated by a variety of methods including, but not limited to, hot pressing. The A-side of the dual-layer pressed felt 506 is shaped to match the B-surface contour of the pre-formed backing cloth 504. The B-side of the dual-layer pressed felt 506 is shaped to match the contour of the cushion pan 508 and ensure proper engagement with a gasket 507. The gasket 507 may comprise a variety of materials including, but not limited to, closed-cell foam, that under loading, is air-impermeable. The seat pad 503, pre-formed backing cloth 504, three-dimensional mesh 505, dual-layer pressed felt 506, and closed-cell foam gasket 507 comprise the seat pad assembly of the seat cushion 512. Due to the compact nature of seat design, the cushion pan 508, further mounted to the frame of the seat, can be connected to a blower 510 via blower adapter 509 and a second closed-cell foam gasket 507'. The ductless design described in the present embodiment, in combination with the pre-formed backing cloth 504, decreases air loss in the seat ventilation system by 100%.

Figure 6:
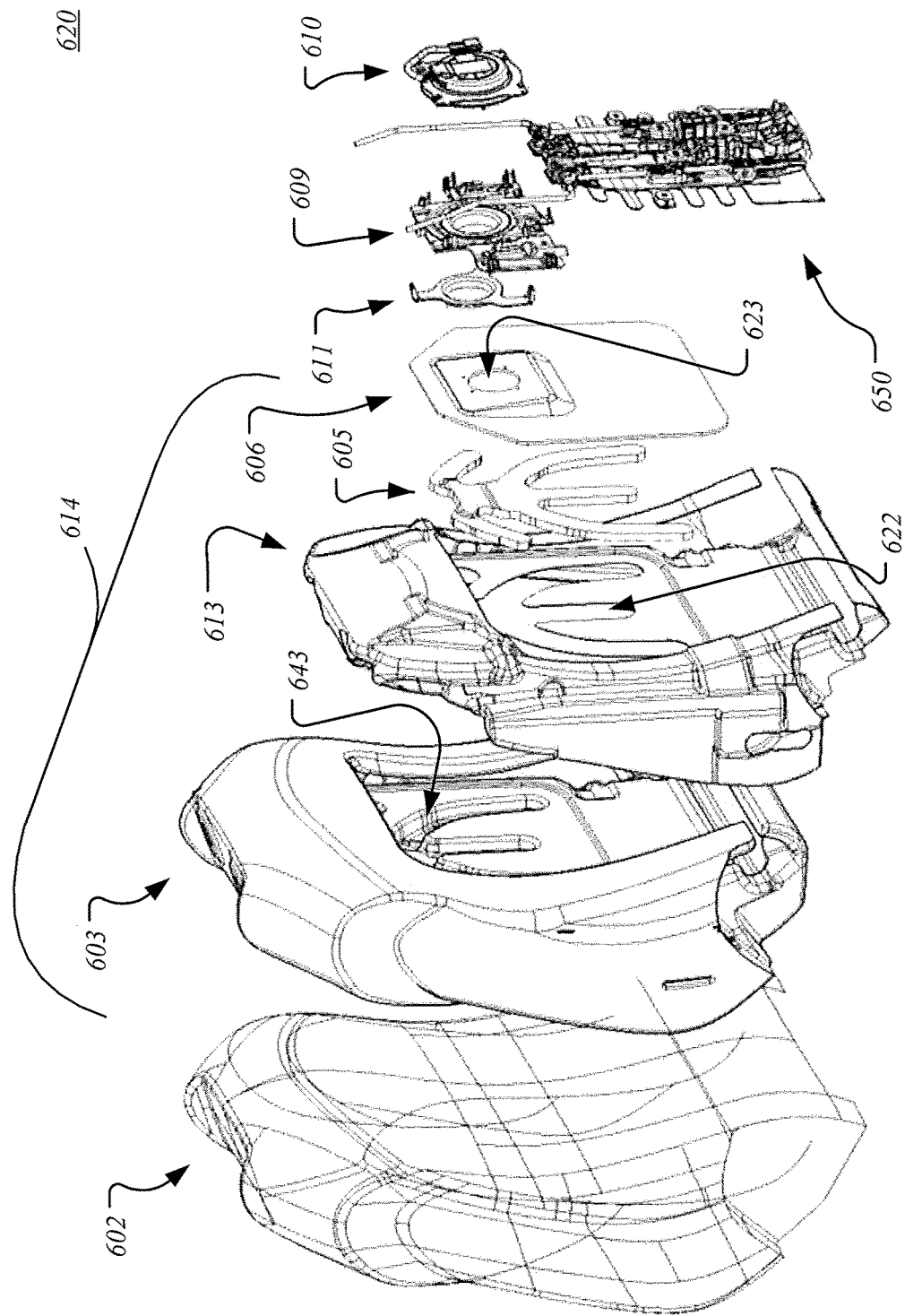
FIG. 6 is an exploded view of the seat back of the seat of a vehicle, according to an exemplary embodiment of the present disclosure.

FIG. 6 is an exploded view of the seat back of the seat of a vehicle, according to an exemplary embodiment of the present disclosure. In the exemplary embodiment, a seat trim cover 602 wraps around a seat pad 603 of the seat back 620. The seat pad 603 includes a series of seat pad air channels (not visible) disposed towards the front of the seat pad 603 that extend the thickness of the seat pad 603 to a seat pad air reservoir 643. A backing cloth 613 is adhered to a B-surface of the seat pad 603 to create a sealed surface and prevent air loss at unintended sections of the seat pad 603. The backing cloth 613 includes a three-dimensional mesh cutout 622 in a shape corresponding to the shape of a three-dimensional mesh 605. The three-dimensional mesh 605 is inserted within the seat pad air reservoir 643 of the seat pad 603 and provides support to the system of air flow conduits. The three-dimensional mesh 605 may be fabricated in a variety of shapes pursuant to the demands of the seat in the context of the user. A dual-layer pressed felt 606 is sealed to the backing cloth 613. An A-side of the dual-layer pressed felt 606 is comprised of cross-linked polypropylene for contact with the three-dimensional mesh 605, while a B-side of the dual-layer pressed felt 606 is comprised of felt. The dual-layer pressed felt 606 may be fabricated by a variety of methods including, but not limited to, hot pressing. The A-side of the dual-layer pressed felt 606 is shaped to match the B-surface contour of the backing cloth 613. The B-side of the dual-layer pressed felt 606 is shaped according to the dimensions of the seat back, mindful of form factor, and with a connection portal for attachment to a pressed felt adapter 611. An air flow passage 623 is disposed in the dual-layer pressed felt 606 to allow air flow between the seat pad air reservoir 643 and the blower 610. The seat pad 603, backing cloth 613, three-dimensional mesh 605, dual-layer pressed felt 606, and pressed felt adapter 611 comprise the seat pad assembly of the seat back 614. The pressed felt adapter 611 allows for attachment of the blower adapter 609 to the seat pad assembly of the seat back 614. The blower adapter 609 can be further mounted to the lumbar system 650. Mounting the blower adapter 609 to the lumbar system 650 allows the blower 610 to be mounted without additional ductwork. The ductless design described in the present embodiment decreases air loss in the seat ventilation system.

Figure 7A:
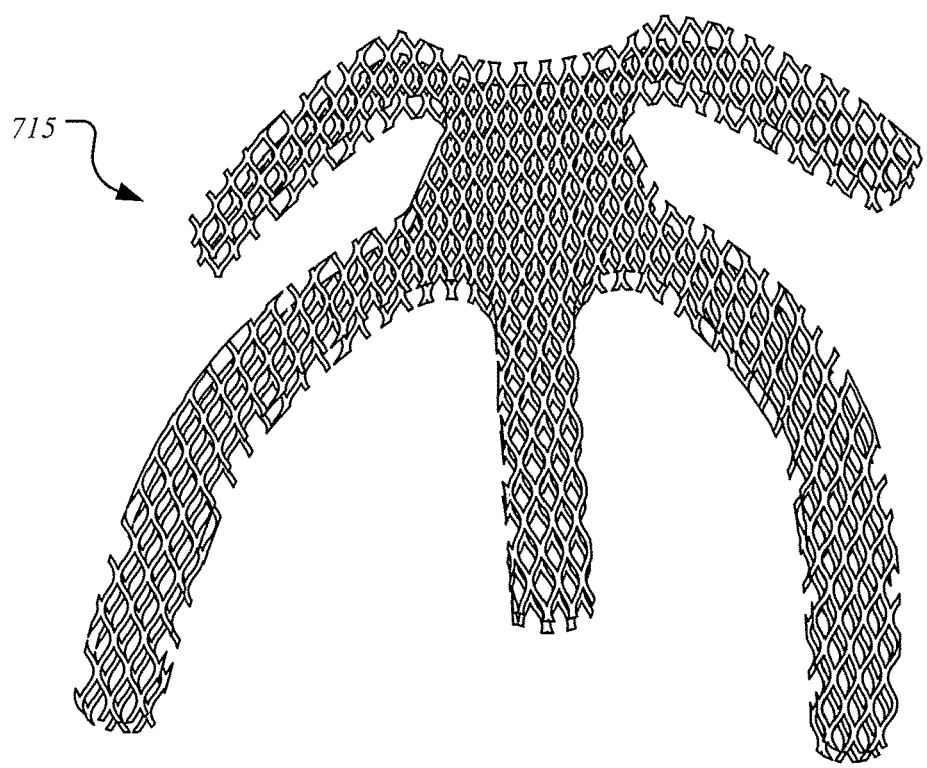
FIG. 7A is an illustration of a three-dimensional mesh employed in a seat back of the seat of a vehicle, according to an exemplary embodiment of the present disclosure.
Figure 7B:
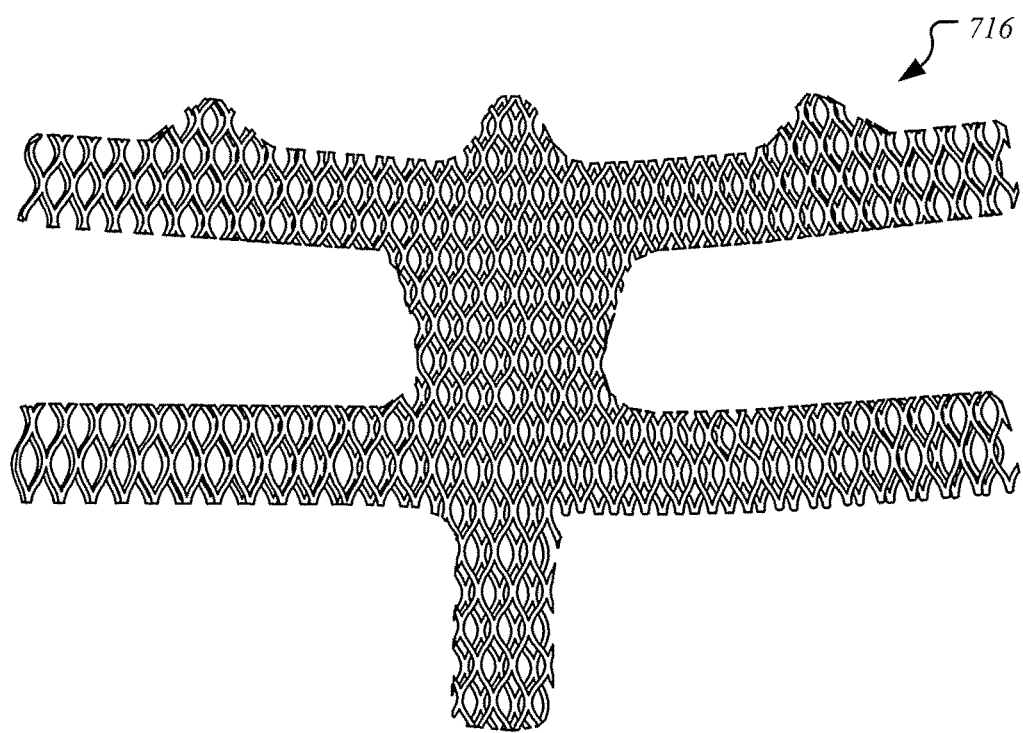
FIG. 7B is an illustration of a three-dimensional mesh employed in a seat cushion of the seat of a vehicle, according to an exemplary embodiment of the present disclosure.

FIG. 7A and FIG. 7B are illustrations of a three-dimensional mesh employed in a seat back and a seat cushion, respectively, of the seat of a vehicle, according to an exemplary embodiment. FIG. 7A is the three-dimensional mesh 715 of the seat back of a seat of an exemplary embodiment, wherein the upper portion is positioned near the shoulder blades of the user. In this orientation, air flow permeates the lattice structure and extends across the shoulders and down the torso for maximal heat removal. FIG. 7B is a three-dimensional mesh 716 of the seat cushion of a seat of an exemplary embodiment, wherein the upper portion is positioned near the front of the seat cushion. In this orientation, the narrow, bottom portion of the three-dimensional mesh 716 is positioned near the tailbone of the user while the elongated, upper portions provide air flow to the legs of the user for maximal heat removal.

Figure 8:
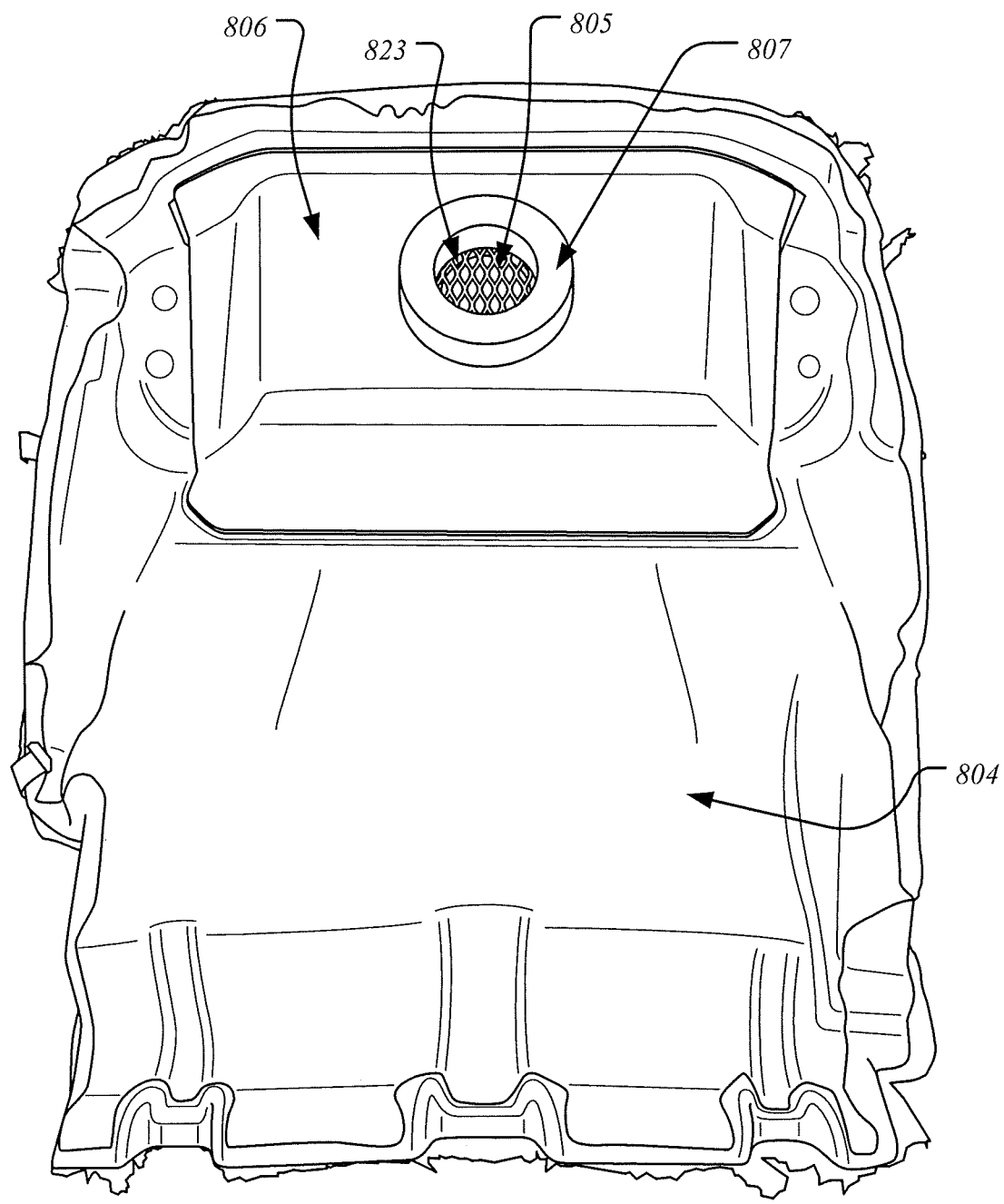
FIG. 8 is an illustration of a pad assembly of the seat cushion of the seat of a vehicle, according to an exemplary embodiment of the present disclosure.

FIG. 8 is an illustration of a pad assembly of the seat cushion of the seat of a vehicle, according to an exemplary embodiment. From this orientation of the seat pad assembly of the seat cushion 812, a closed-cell foam gasket 807 is connected circumferentially to an air flow passage 823 of a dual-layer pressed felt 806. Further, the dual-layer pressed felt 806 supports a three-dimensional mesh 805. A pre-formed backing cloth 804 is attached to the B-surface of a seat pad. During assembly, a seat cushion pan would be attached to the dual-layer pressed felt 806 via the closed-cell foam gasket 807. Subsequently, the seat cushion pan would be attached to a blower adapter via second closed-cell foam gasket before final connection with a blower. From this perspective, the arrangement of the components of the pad assembly is visible, including the nested nature of the three-dimensional mesh 805 between the seat pad and the dual-layer pressed felt 806.

Figure 9:
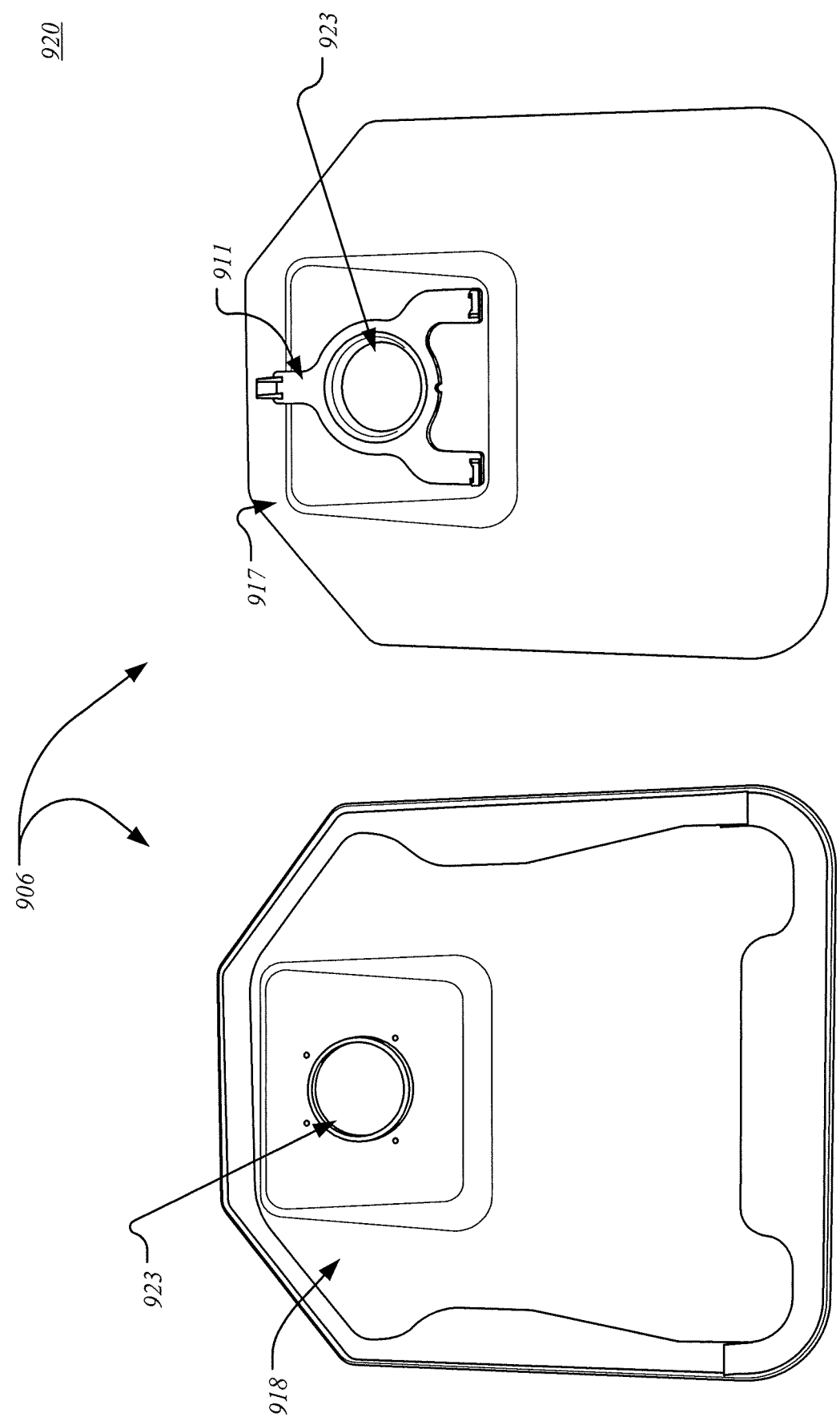
FIG. 9 B is a component of a dual-layer pressed felt of the seat back of the seat of a vehicle, according to an exemplary embodiment of the present disclosure.

FIG. 9A and FIG. 9B are components of a dual-layer pressed felt of the seat back of the seat of a vehicle, according to an exemplary embodiment. FIG. 9A illustrates the A-side of the dual-layer pressed felt 906 of the seat back. An air flow passage 923 allows for air flow communication between the blower and the three-dimensional mesh. The A-side is comprised of a cross-linked polypropylene 918 for contact with the three-dimensional mesh of the seat pad air reservoir. The B-side of the dual-layer pressed felt 906 is comprised of felt 917. A pressed felt adapter 911 is connected circumferentially to the air flow passage 923 of the B-side of the dual-layer pressed felt 906. The pressed felt adapter 911 provides a connection point for the blower adapter.

Figure 10:
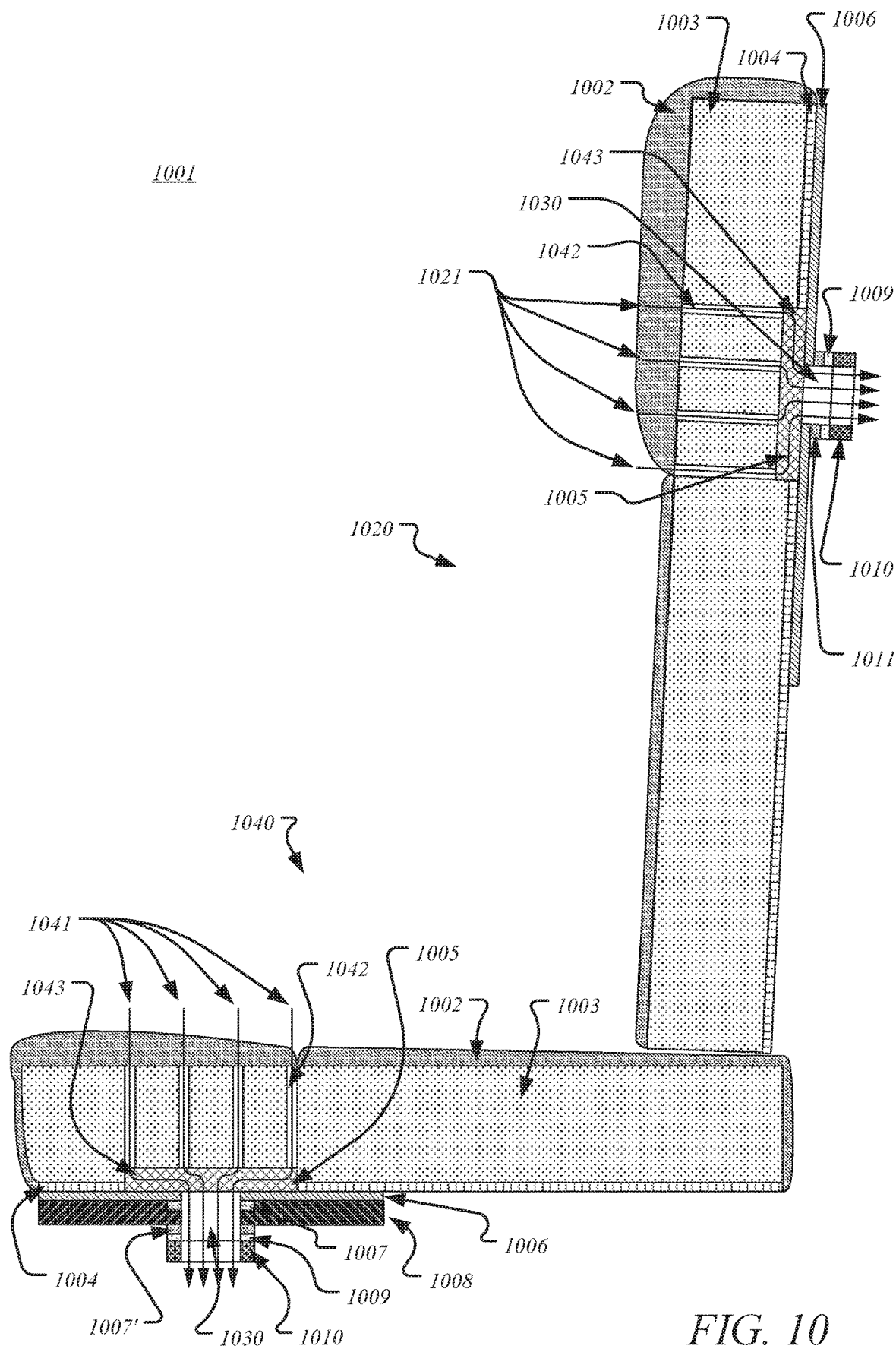
FIG. 10 is a cross-sectional view of a seat of a vehicle, according to an exemplary embodiment of the present disclosure.

FIG. 10 is a cross-sectional view of a seat of a vehicle, according to an exemplary embodiment. Seat 1001 is comprised of a seat back 1020 and a seat cushion 1040. Pertaining to both the seat back 1020 and the seat cushion 1040, a blower 1010, configured to pull air, draws air through the trim cover 1002 and into the seat pad air channels 1042 of the seat pad 1003. In an embodiment, the trim cover 1002 is comprised of a substantially air-permeable textile and does not contain trim cover air passages. Drawn air enters the seat pad air reservoir 1043, passes through the three-dimensional mesh 1005 and enters the main air conduit 1030. In the seat cushion 1040, air flow 1041 passes through a pressed felt air passage (not referenced) of the dual-layer pressed felt 1006, a cushion pan 1008, a blower adapter 1009, and is exhausted through the blower 1030. System pressure is maintained with the aid of closed-cell foam gaskets 1007, 1007', pre-formed backing cloth 1004, and a paucity of ductwork. In the seat back 1020, air flow 1021 passes through a pressed felt air passage (not referenced) of the dual-layer pressed felt 1006, a pressed felt adapter 1011, a blower adapter 1009, and is exhausted through the blower 1030. System pressure is maintained with the aid of a backing cloth 1004 and a paucity of ductwork.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A ventilated seat, comprising:
   an air-permeable seat pad cover;
   a seat pad having a first surface, a second surface, and a void connecting the first surface with the second surface, the first surface being in fluid communication with the air-permeable seat pad cover;
   a three-dimensional mesh of a pre-determined shape disposed within at least a portion of the void of the seat pad;
   a first partition disposed on the second surface of the seat pad, the first partition having a full-thickness void in a pre-determined shape based on the pre-determined shape of the three-dimensional mesh;
   a second partition, adjacent to the first partition, comprising an air-impermeable material and including at least one full-thickness void, the second partition being a pressed material having a first layer and a second layer; and
   a ductless blower in fluid communication with the second partition,
   wherein the first layer of the pressed material is a polymer, a metal, a synthetic textile, or a combination thereof, and
   wherein the second layer of the pressed material is a polymer, a metal, a synthetic textile, or a combination thereof.

2. The ventilated seat of claim 1, wherein the three-dimensional mesh is comprised of a flexible, incompressible material that maintains a structure of the void of the seat pad.

3. The ventilated seat of claim 1, wherein the ventilated seat is a seat cushion, a seat back, or a combination thereof.

4. The ventilated seat of claim 3, wherein the seat cushion comprises at least one gasket that joins sequential components of the seat cushion.

5. The ventilated seat of claim 1, wherein the first partition is a pre-formed backing material comprised of a polymer, a synthetic textile, a textile, or a combination thereof.

6. The ventilated seat of claim 1, wherein
   a contour of the first layer of the pressed material matches a contour of the second surface of the seat pad, and
   a contour of the second layer of the pressed material matches a contour of a cushion pan in fluid communication with the first partition and the ductless blower.

7. The ventilated seat of claim 1, wherein a mesh structure of the three-dimensional mesh directs air flow.

8. The ventilated seat of claim 1, wherein the first partition is a backing material comprised of a polymer, a synthetic textile, a textile, or a combination thereof.

9. The ventilated seat of claim 1, wherein a contour of the first layer of the pressed material matches a contour of the second surface of the seat pad.

10. The ventilated seat of claim 1, wherein the ductless blower is configured to pull air or push air.

11. A seat pad assembly, comprising:
    a seat pad having a first surface, a second surface on an opposite face, and a void connecting the first surface with the second surface;
    a three-dimensional mesh of a pre-determined shape disposed within at least a portion of the void of the seat pad;
    a first partition of a pre-determined thickness disposed on the second surface of the seat pad, the first partition having a full-thickness void in a pre-determined shape based on the pre-determined shape of the three-dimensional mesh; and
    a second partition, adjacent to the first partition, comprised of an air-impermeable material and including at least one full-thickness void, the second partition being a pressed material having a first layer and a second layer,
    wherein the first layer of the pressed material is a polymer, a metal, a synthetic textile, or a combination thereof, and
    wherein the second layer of the pressed material is a polymer, a metal, a synthetic textile, or a combination thereof.

12. The seat pad assembly of claim 11, wherein the seat pad, the three-dimensional mesh, the first partition, and the second partition are sequentially disposed within the seat pad assembly.

13. The seat pad assembly of claim 11, wherein the first partition is a backing material comprised of a polymer, a synthetic textile, a textile, or a combination thereof.

14. The seat pad assembly of claim 11, wherein the first partition is a pre-formed backing material comprised of a polymer, a synthetic textile, a textile, or a combination thereof.

15. The seat pad assembly of claim 11, wherein a mesh structure of the three-dimensional mesh directs air flow.

16. The ventilated seat of claim 1, wherein the seat pad, the three-dimensional mesh, the first partition, the second partition, and the ductless blower are sequentially disposed within the ventilated seat.

* * * * *